(12) United States Patent
Yu et al.

(10) Patent No.: US 11,120,014 B2
(45) Date of Patent: Sep. 14, 2021

(54) ENHANCED SEARCH CONSTRUCTION AND DEPLOYMENT

(71) Applicant: INTERNATIONAL BUSINESS MACHINES CORPORATION, Armonk, NY (US)

(72) Inventors: Yi Qin Yu, Beijing (CN); En Liang Xu, Beijing (CN); Shi Lei Zhang, Beijing (CN); Bibo Hao, Beijing (CN); Eryu Xia, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 322 days.

(21) Appl. No.: 16/199,023

(22) Filed: Nov. 23, 2018

(65) Prior Publication Data
US 2020/0167347 A1    May 28, 2020

(51) Int. Cl.
*G06F 16/242* (2019.01)
*G06F 16/28* (2019.01)
(Continued)

(52) U.S. Cl.
CPC ...... *G06F 16/242* (2019.01); *G06F 16/24578* (2019.01); *G06F 16/288* (2019.01); *G06F 16/9024* (2019.01)

(58) Field of Classification Search
CPC .................. G06F 16/242; G06F 16/288; G06F 16/24578; G06F 16/9024
(Continued)

(56) References Cited

U.S. PATENT DOCUMENTS 8,280,882 B2    10/2012  Troy et al.
9,715,495 B1 *   7/2017  Tacchi ................ G06F 16/358
(Continued)

FOREIGN PATENT DOCUMENTS

CN          102456016 A       5/2012

OTHER PUBLICATIONS

Aromataris, "Constructing a Search Strategy and Searching for Evidence", Systematic Reviews, American Journal of Nursing, vol. 114, No. 5, May 2014, pp. 49-56.
(Continued)

*Primary Examiner* — Kimberly L Wilson
(74) *Attorney, Agent, or Firm* — Tutunjian & Bitetto, P.C.; Joseph Petrokaitis

(57) ABSTRACT

A computer-implemented method, system, and computer program product are provided for enhanced search strategies. The method includes selecting, by a processor device, known candidate sources related to a search topic. The method also includes ranking, by the processor device, keyphrase candidates from the known candidate sources according to inter-topic weighting. The method additionally includes assembling, by the processor device, a search string of a predetermined number of top ranked keyphrase candidates. The method further includes generating, by the processor device, new candidate sources from a candidate source repository responsive to the search string. The method also includes defining, by the processor device, a candidate source pool by the known candidate sources and the new candidate sources to reduce user search times on computer interface devices.

20 Claims, 8 Drawing Sheets

(51) Int. Cl.
*G06F 16/901* (2019.01)
*G06F 16/2457* (2019.01)

(58) Field of Classification Search
USPC .......................................................... 707/713
See application file for complete search history.

(56) References Cited

U.S. PATENT DOCUMENTS

| | | | |
|---|---|---|---|
| 2002/0099685 A1* | 7/2002 | Takano | G06F 16/93 |
| 2010/0268703 A1 | 10/2010 | Buck | |
| 2012/0078895 A1* | 3/2012 | Chu-Carroll | G06F 16/332 |
| | | | 707/728 |
| 2015/0310005 A1 | 10/2015 | Ryger et al. | |

OTHER PUBLICATIONS

Russell-Rose, "Expert Search Strategies: The Information Retrieval Practices of Healthcare Information Professionals", JMIR Medical Informatics, vol. 5, Issue 4, Oct. 2017, 11 pages.
Masconi, "Recalibration in Validation Studies Risk Prediction Models: A Systematic Review", International Journal of Statistics in Medical Research, vol. 4, No. 4, Nov. 2015 pp. 347-369.
Bougouin, "TopicRank: Graph-Based Topic Ranking for Keyphrase Extraction", International Joint Conference on Natural Language Processing, Oct. 2013, pp. 543-551.

* cited by examiner

ENHANCED SEARCH CONSTRUCTION AND DEPLOYMENT

BACKGROUND

Technical Field

The present invention generally relates to searching technologies, and more particularly to enhanced search construction and deployment.

Description of the Related Art

Knowledge acquisition is a key capability for modern researchers. In order to get authoritative and up-to-date clinical knowledge from professional papers, a clinical researcher can spend a lot of time searching clinical papers from online repositories. The process is rigorous and time-sensitive each time the researcher starts a new research topic.

SUMMARY

In accordance with an embodiment of the present invention, a computer-implemented method is provided for enhanced search strategies. The method includes selecting, by a processor device, known candidate sources related to a search topic. The method also includes ranking, by the processor device, keyphrase candidates from the known candidate sources according to inter-topic weighting. The method additionally includes assembling, by the processor device, a search string of a predetermined number of top ranked keyphrase candidates. The method further includes generating, by the processor device, new candidate sources from a candidate source repository responsive to the search string. The method also includes defining, by the processor device, a candidate source pool by the known candidate sources and the new candidate sources to reduce user search times on computer interface devices.

In accordance with another embodiment of the present invention, a computer program product is provided for enhanced search strategies. The computer program product includes a non-transitory computer readable storage medium having program instructions. The program instructions are executable by a computer to cause the computer to perform a method. The method includes selecting, by a processor device, known candidate sources related to a search topic. The method also includes ranking, by the processor device, keyphrase candidates from the known candidate sources according to inter-topic weighting. The method additionally includes assembling, by the processor device, a search string of a predetermined number of top ranked keyphrase candidates. The method further includes generating, by the processor device, new candidate sources from a candidate source repository responsive to the search string. The method also includes defining, by the processor device, a candidate source pool by the known candidate sources and the new candidate sources to reduce user search times on computer interface devices.

In accordance with yet another embodiment of the present invention, a search system for enhanced search strategies is provided. The search system includes a processing system having a processor device, a display, and memory receiving candidate sources. The processing system is programmed to select known candidate sources related to a search topic. The processing system is also programmed to rank keyphrase candidates from the known candidate sources according to inter-topic weighting. The processing system is additionally programmed to assemble a search string of a predetermined number of top ranked keyphrase candidates. The processing system is further programmed to generate new candidate sources from a candidate source repository responsive to the search string. The processing system is also programmed to define a candidate source pool by the known candidate sources and the new candidate sources to reduce user search times on computer interface devices. The processing system is further programmed to display the candidate source pool.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Figure 1:
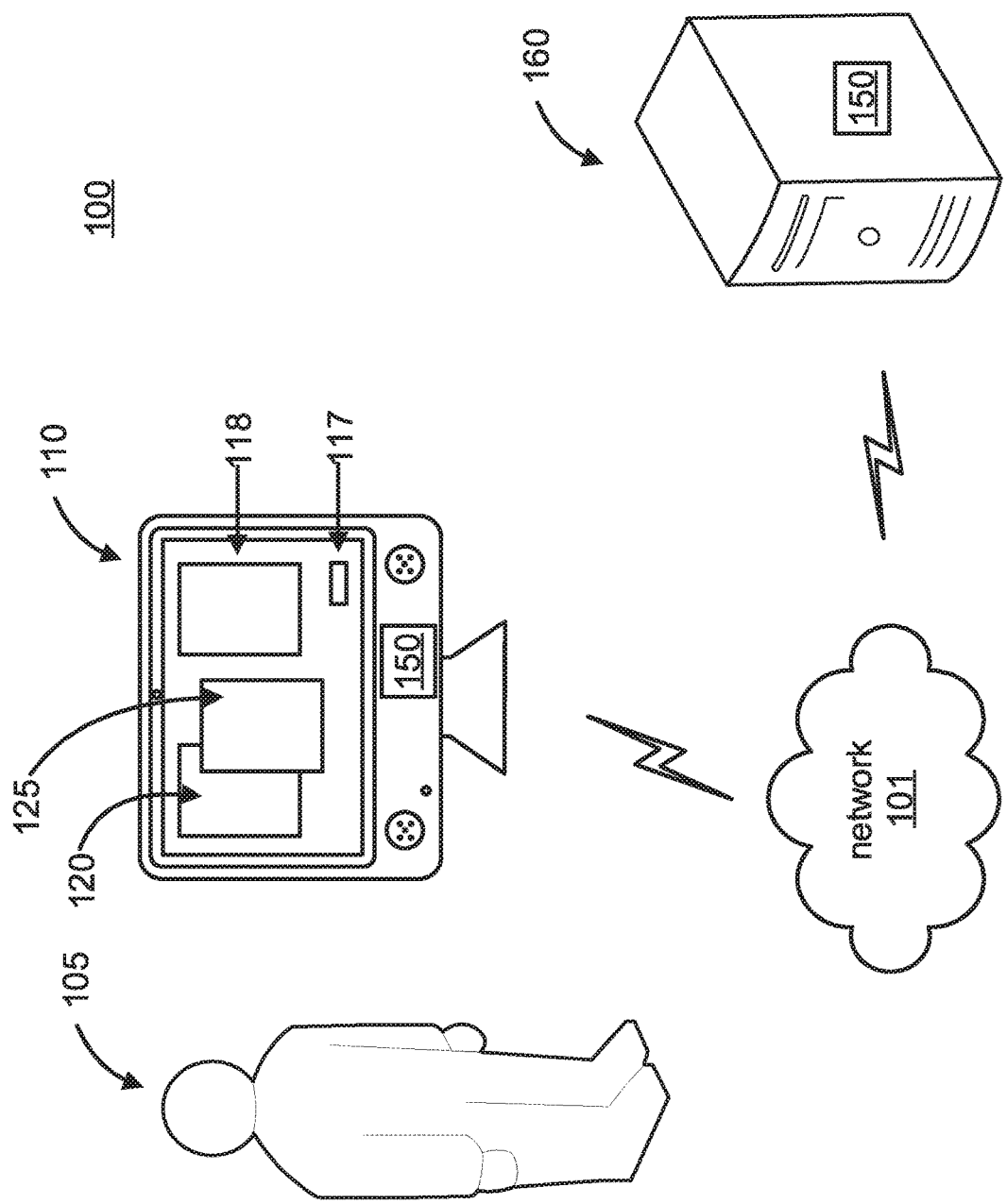
FIG. 1 is an environment with a computing system utilizing an enhanced search strategy, in accordance with embodiments of the present invention.

Embodiments in accordance with the present invention provide methods and systems for helping knowledge workers to enhance structured professional paper search strategies utilizing a limited set of known papers. Further, the methods and systems can enhance retrieval of papers that closely relate to the professional search topics to reduce user search times on computer interface devices. The methods and systems can be utilized for searching in articles, webpages, digital files, or professional papers, e.g., published scientific papers or journals.

A systematic review is a type of literature review produced by clinical researchers, which aims to collect secondary data from published clinical papers to provide a complete, exhaustive summary for a research question. A time-consuming step in conducting a systematic review can be to devise a structured question to guide the review and do searches to retrieve relevant papers. The search strategy can include at least a set of keywords as search terms, and other objects such as fields about in which part the keywords will be searched in clinical papers and can include search logic operators to organize the keywords. A thorough search of the literature can be performed to query relevant papers. Then, the titles and abstracts of retrieved articles can be checked for eligibility and relevance to form an inclusion set, which could relate back to the research problem Referring now to the drawings in which like numerals represent the same or similar elements and initially to FIG. 1, an environment 100 to which embodiments of the present invention may be applied is shown in accordance with a useful embodiment. The environment 100 can include a computing system 110 with an enhanced search strategy 150. In one embodiment, the computing system 110 can have the enhanced search strategy 150 integrated into the computing system 110. In another embodiment, the enhanced search strategy 150 can be utilized from a remote system 160 connected to the computing system 110 through a network 101. The remote system 160 can be a cloud computing implementation or a remote server.

The computing system 110 can have a display and a user interface. A user 105 can upload known candidate sources 120 that are related to a search. The enhanced search strategy 150 can rank keyphrase candidates from the known candidate sources 120. The enhanced search strategy 150 can display the rank of the keyphrase candidates for the user 105 to permit the user 105 to adjust or modify the ranking of any of the keyphrase candidates. The keyphrase candidates can be assembled into a search string to generate new candidate sources 125. The known candidate sources 120 and the new candidate sources 125 can encompass a candidate source pool. The enhanced search strategy 150 can place buttons 117 on the display that represent each of the keyphrase candidates. The user 105 can click a button 117 to open a window with a list of sources 118 from the candidate source pool that can include the keyphrase candidate on the selected button 117. This permits the user 105 to further narrow down the candidate source pool based on the keyphrase candidates.

In one embodiment, an enhanced search strategy 150 can streamline the iterative paper searching process by automatically selecting papers that most probably match, visualizing in a paper citation graph, and iteratively querying papers until there is no new papers selected. The enhanced search strategy 150 can include page ranking and topic-based clustering to accelerate and fulfill the paper searching tasks. The enhanced search strategy 150 can provide a generalized mechanism to accelerate the iterative clinical paper searching process by streamlining a set of paper querying tasks until the results are converged. The enhanced search strategy 150 can produce a visualization based on paper citation graph to show intermediate results, which can provide evidence and provenance about how the papers are collected and selected.

Figure 2:
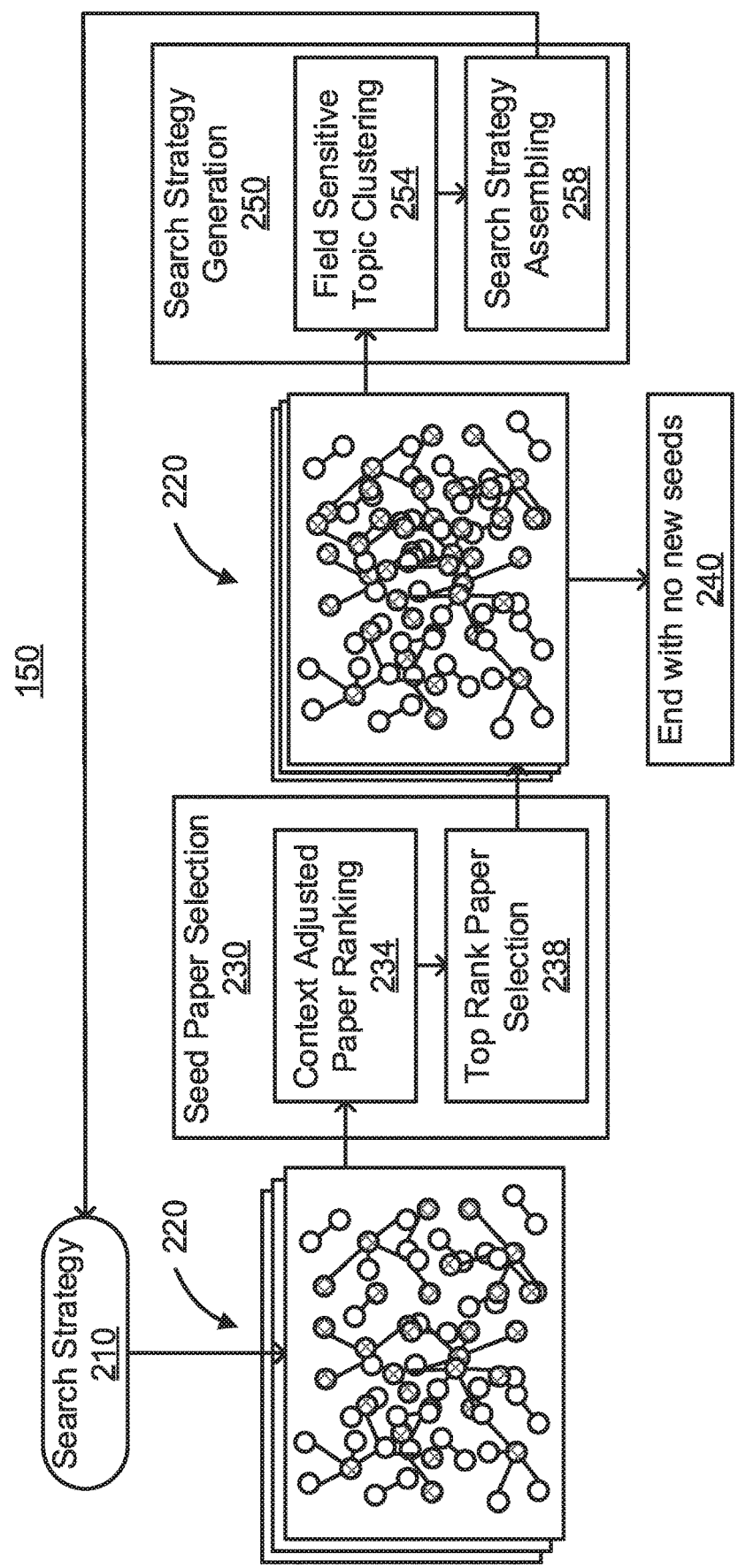
FIG. 2 is a block/flow diagram of the enhanced search strategy, in accordance with an embodiment of the present invention.

FIG. 2 is a block/flow diagram of the enhanced search strategy, in accordance with an embodiment of the present invention. The enhanced search strategy 150 can include a clinical paper citation graph (PCGraph) 220, which can be employed to visualize the citation relationship among papers, and key steps such as seed paper selection 230 and search strategy generation 250, which help to streamline the iteration of multiple paper searching rounds until there is no new seed selected 240. The results of these steps can be updated to the paper citation graph 220 iteratively.

The PCGraph 220 is a graph representing the citation relationships among clinical papers. Each node represents a retrieved paper. Edges between the nodes represent the direction of citation relationship. For example, if there is an edge from node A to node B, that means the clinical paper B is cited by paper A. To capture the intermediate results in each iteration, PCGraph 220 can be specifically equipped with the following features, which can provide evidence and provenance about how the papers are collected and selected.

The PCGraph 220 can enable the paper searching process in an iterative way. Due to the huge number of papers retrieved, the PCGraph 220 can be useful to reveal in which iteration a paper is retrieved, and how many times the paper is queried in different iterations. Intuitively, the more times a paper is queried, the more likely it could match the research problem, and be selected to the final paper set. The layer feature in the PCGraph 220 represents the corresponding iteration. Nodes in different layer have different transparency, and nodes with more overlap times will have, e.g., darker colors or other identifying characteristics.

A node in the PCGraph 220 can have multiple roles, which capture different characteristics of a retrieved paper. The layer feature can represent the iteration in which the paper is retrieved, as well as the overlap times of a paper in different iterations. Another setting is whether the corresponding paper is selected as a seed paper, which is selected to the final paper set, and will be used to generate new search strategy 210 for the next iteration. Nodes retrieved by the current iteration can look clear with concrete colors. More overlapped nodes can be represented with, e.g., darker colors, etc. Seed nodes can be highlighted with, e.g., a different shade or texture.

The enhanced search strategy 150 can form an inclusion paper set, which could relate back to the research problem or topic. Within the enhanced search strategy 150, the papers can be included iteratively, which means that in each iteration, there will be new papers selected and included into the set, and these papers will also be used as seeds to generate new search strategy for the next iteration.

Consider the problem of seed paper selection in an iteration. Without regard to other information, every paper retrieved by the enhanced search strategy 150 would have the same probability to be selected as a seed paper. If the citation relationships among these papers is considered, the papers with more citations stand out more likely as exceptional because their contents could be more influential. Given the hypothesis that the retrieved papers can be probably related to the research topic, which can be represented by the enhanced search strategy 150, the most cited papers could have higher probabilities to match the topic than other less cited ones. The importance level based on citations can be measured by a page ranking algorithm. To transfer the paper importance measurement problem to the problem of assessing the probability of a paper relating to a specific topic, information can be further leveraged from both different paper roles and the context from other iterations. The relationship between a paper and existing seed papers can be considered for example. If this paper cites a seed paper, the paper can more likely introduce the same topic with the seed paper. Next, the relationship between the paper and other papers retrieved multiple times by different iterations can be considered. A paper retrieved multiple times means it can most likely be consistent with similar research topics. This kind of citation could also increase the confidence of this paper to be a seed paper.

Figure 3:
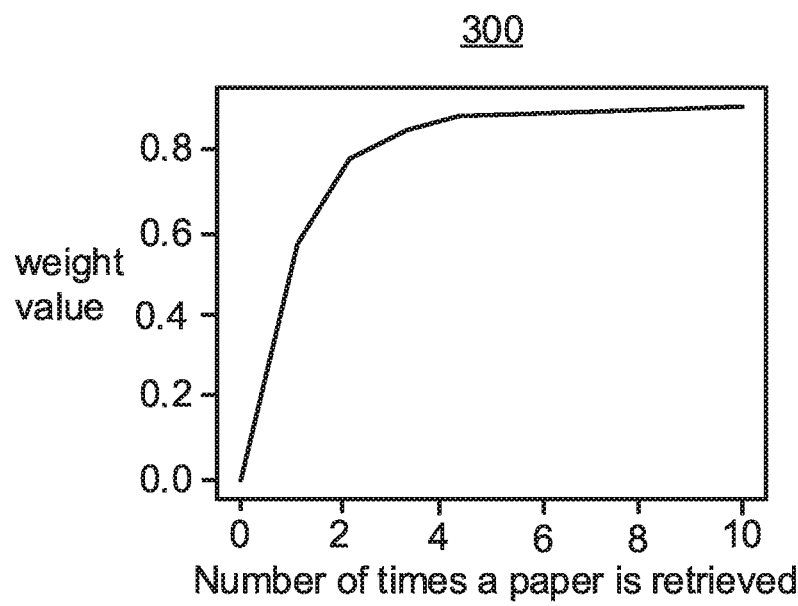
FIG. 3 is a graph showing an exponential decay curve, in accordance with an embodiment of the present invention.

An example of a page rank algorithm, $$PR(u) = \frac{1-d}{N} + d \sum_{v \in B(u)} \frac{PR(v)}{L(v)}$$

where u and v represent web pages. PR (u) and PR(v) are rank scores of pages u and v, respectively. d is a dampening factor. N is the total number of pages. B(u) is the set of pages that point to u. L(v) denotes the number of outgoing links of page v. After considering the impact of seed papers and multi-retrieved papers, the context adjusted ranking 234 algorithm is, e.g., as following, $$CAPR(u) = \frac{1-d}{N} + d \sum_{v \in B(u)} \frac{w \times CAPR(v)}{L(v)}$$

where CAPR(u) and CAPR(v) are context adjusted rank scores of pages u and v, respectively. w is the weight to adjust the ranking in links of page v, which is defined as, $$w = 1 + \alpha + \beta$$

where $\alpha$ is the importance weight for seed papers and $\beta$ is the importance weight for multi-retrieved papers. For example, if a paper is neither a seed paper nor a multi-retrieved paper, it is $\alpha=0$ and $\beta=0$. Ranking the papers to select the top rank papers 238. FIG. 3 is a graph 300 showing an exponential decay curve, in accordance with an embodiment of the present invention. In another useful example, $\alpha$ and $\beta$ could be an exponential decay kernel, $\alpha = \lambda - \lambda x e^{-\lambda t}$, where the number of times the paper is retrieved by different iteration is the x-axis, and $\lambda$ be the importance weight for a seed node which range from 0 to 1 on the y-axis. The same as the definition of $\beta$. The only difference can be the value of $\lambda$. $\alpha$ can have a higher $\lambda$ than $\beta$. The graph shows that the more the paper is retrieved, then the higher weight the paper is given.

If there are new seed papers selected in an iteration, new search strategies can be generated to cover information from these newly included seed papers and launch the next iteration to further retrieve papers. Topic-based clustering can be applied to extract common concepts from different fields of the seed papers and properly assemble them together in the format of the enhanced search strategy 150.

Topic-based clustering can an unsupervised approach for automatic keyphrase extraction from documents. Instead of extracting words as candidate keyphrases directly, the topic-based clustering groups the candidate keyphrases into topics, such that each topic can be composed of all the candidate keyphrases and only those candidate keyphrases that are related to that topic. The keyphrase candidates can be extracted from different fields of the source material (e.g., title, abstract, keywords, etc.) and the keyphrase candidates can be clustered into different topics. The field information can be recorded along with the keyphrase candidates. The structure of a search strategy 258 can include a set of keyphrase candidates as search terms and fields aligned with the search term about in which part they will be searched in clinical papers. Keyphrase candidates which belong to the same topic can be jointly connected by "OR", and "AND" is used to connect bunches of keyphrase candidates belonging to different topics.

Figure 4:
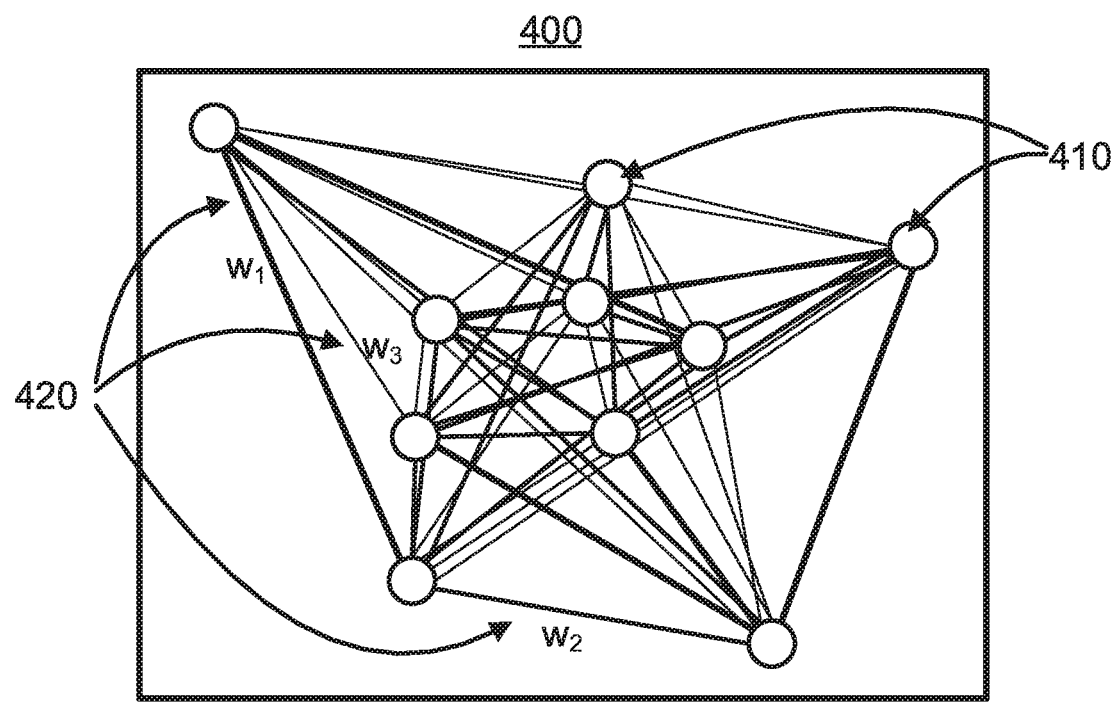
FIG. 4 is a graph showing a topic ranking, in accordance with an embodiment of the present invention.

In one example, a paper can be topic-based clustered. The paper can have a title and abstract. The title can include "<ArticleTitle> Development and Validation of a Risk score Model for Type 2 Diabetes.</ArticleTitle>." The abstract can include "<Abstract> Some global models to predict the risk of diabetes may not be applicable to local populations. We aimed to develop and validate a score to predict type 2 diabetes mellitus (T2DM) in a rural adult Chinese population . . . </Abstract>." The results of the topic-based clustering can include multiple topic clusters with each keyphrase in single quotes like, e.g., the following 6 topic clusters: [0]:['signific variabl', 'variabl']; [1]:['valid', 'valid dataset']; [2]:['dataset', 'deriv dataset']; [3]:['deriv']; [4]: ['cox regress model', 'framingham model', 'global model', 'idr model', 'model', 'model accuraci]; [5]:['incod t2dm', 't2dm']. The keyphrases are clustered into many topics for which 6 topics are illustrated. Next, these clustered topics can be represented in a graph, in which the weight of edges can be calculated by a weight equation. If there are 10 keyphrases, the keyphrases can be clustered according to the similarities among them. For example, if two keyphrases have at least 25% of the words overlapping, the keyphrases can be considered to be "similar". Similar keyphrases can be put into one topic. After the topics are generated, the relationships between the topics can be represented in the graph, with the weights on edges representing how strong two topics are related, as seen in FIG. 4. The graph is a fully connected graph, which means that each topic connects with all other topics. The topic which has higher weights with other topics can be ranked with a higher score. The details are described below.

FIG. 4 is a graph showing a topic ranking, in accordance with an embodiment of the present invention. To generate the enhanced search strategy 150, a graph-based topic ranking can be employed for keyphrase extraction. A graph 400 can be built in which vertices are topics 410, represented as clusters of lexically similar keyphrase candidates. The edges 420 between the topics 410 can have different weights, e.g., w1, w2, w3, etc., with the different weights being represented on the graph 400 by, e.g., different thickness lines, lines with different dashing patterns, numerical representations on the line, etc. The weight on edges 420 in the graph 400 is defined as following:

$$w_{i,j} = \sum_{c_i \in t_i} \sum_{c_j \in t_j} \text{dist}(c_i, c_j)$$

where $t_i$ refers to the $i^{th}$ topic and $t_j$ refers to the $j^{th}$ topic. $w_{i,j}$ refers to the weight of edge between topic $t_i$ and topic $t_j$. dist($c_i$, $c_j$) refers to the reciprocal distances between the offset positions of the candidate keyphrase $c_i$ and $c_j$ in the paper, which is defined as following:

$$\text{dist}(c_i, c_j) = \sum_{p_i \in pos(c_i)} \sum_{p_j \in pos(c_j)} \frac{1}{|p_i - p_j|}$$

where pos($c_i$) represents all the offset positions of the candidate keyphrase $c_i$. pos($c_j$) represents all the offset positions of the candidate keyphrase $c_j$. $p_i$ refers to offset position between $c_i$ and another candidate keyphrase. $p_j$ refers to offset position between $c_j$ and another candidate keyphrase. Then all topics in the graph are ranked according to their significance. Following the field sensitive topic clustering 254 method, topics will be highlighted when the topic includes more candidate keyphrases from important fields such as paper title and abstract.

$$S(t_i) = (1-\alpha) \cdot \widetilde{p}_t + \alpha \cdot \sum_{t_j \in V_i} \frac{w_{ji}}{\sum_{t_k \in V_j} w_{jk}} S(t_j)$$

S($t_i$) refers to the ranking score of topic $t_i$, α refers to a damping factor, $t_i$ refers to the $i^{th}$ topic, $w_{ji}$ refers to the weight of edge between topic $t_j$ and topic $t_i$. $\tilde{p}$ is a vector of the normalized weights for each candidate considering the field and position information, defined as following:

$$\tilde{p} = \left[ \frac{p_1}{p_1 + p_2 + \ldots + p_{|v|}}, \frac{p_2}{p_1 + p_2 + \ldots + p_{|v|}}, \ldots, \frac{p_{|v|}}{p_1 + p_2 + \ldots + p_{|v|}} \right]$$

here $p_{|v|}$ refers to the $v^{th}$ keyphrase candidate. v refers to the total number of candidates. For each weight, it is defined as following:

$$p_i = \sum \frac{w^{field}}{position\ of\ keyphrases}$$

where $p_i$ is the summation of all the positions the candidate keyphrases are located. For example, if a word is found on the following positions: $2^{nd}$ of title, 5th and $10^{th}$ of abstract, its weight is:

$$\frac{w^{title}}{2} + \frac{w^{abstract}}{5} + \frac{w^{abstract}}{10}.$$

The top ranked topics and corresponding keyphrases extracted from seed papers can be assembled to form a search strategy, which will represent the main topic of these papers. The edges in the graph can be a topic's semantic relation, while the weight of edge can be strength of topic's semantic relation. The topics can be ranked based on the weighted connections with other topics, considering the field weighting when calculating the score of each keyphrase in the topic. The ranking of the keyphrase candidates can be utilized to assemble a search string. Given the ranked topics, the string of search strategy can be assembled from a predetermined number of top ranked topics. The search string can be deployed to generate new candidate sources.

Figure 5:
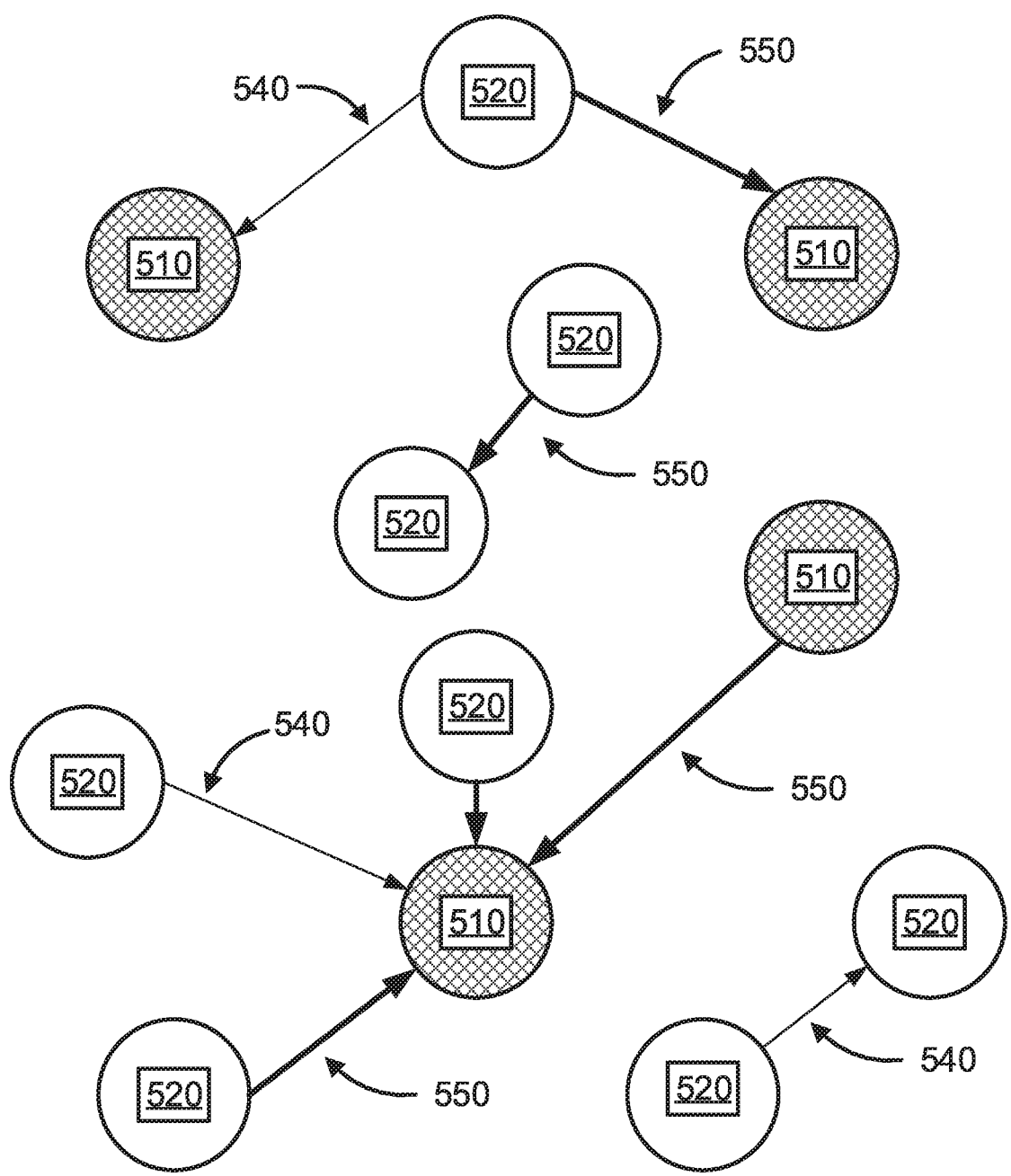
FIG. 5 is a graph-based citation ranking, in accordance with an embodiment of the present invention.

FIG. 5 is a graph-based citation ranking, in accordance with an embodiment of the present invention. A search string is deployed into a search engine to identify new candidate sources 520. The enhanced search strategy 150 can generate a graph 500 with the new candidate sources 520 and the known candidate sources 510. The new candidate sources 520 can be ranked in relation to the known candidate sources 510. Sources that have a weaker relationship 540 can be connected with an identified line of, e.g., less color or weight, as the line connecting sources with a stronger relationship 550. The relationship of the sources can be utilized to rank the new candidate sources 520. The enhanced search strategy 150 can take the new candidate sources 520 ranked highest to include in the candidate source pool. In one embodiment, the highest ranked can include a certain percentage, e.g., top 10%, or a certain number, e.g., the top 50.

Figure 6:
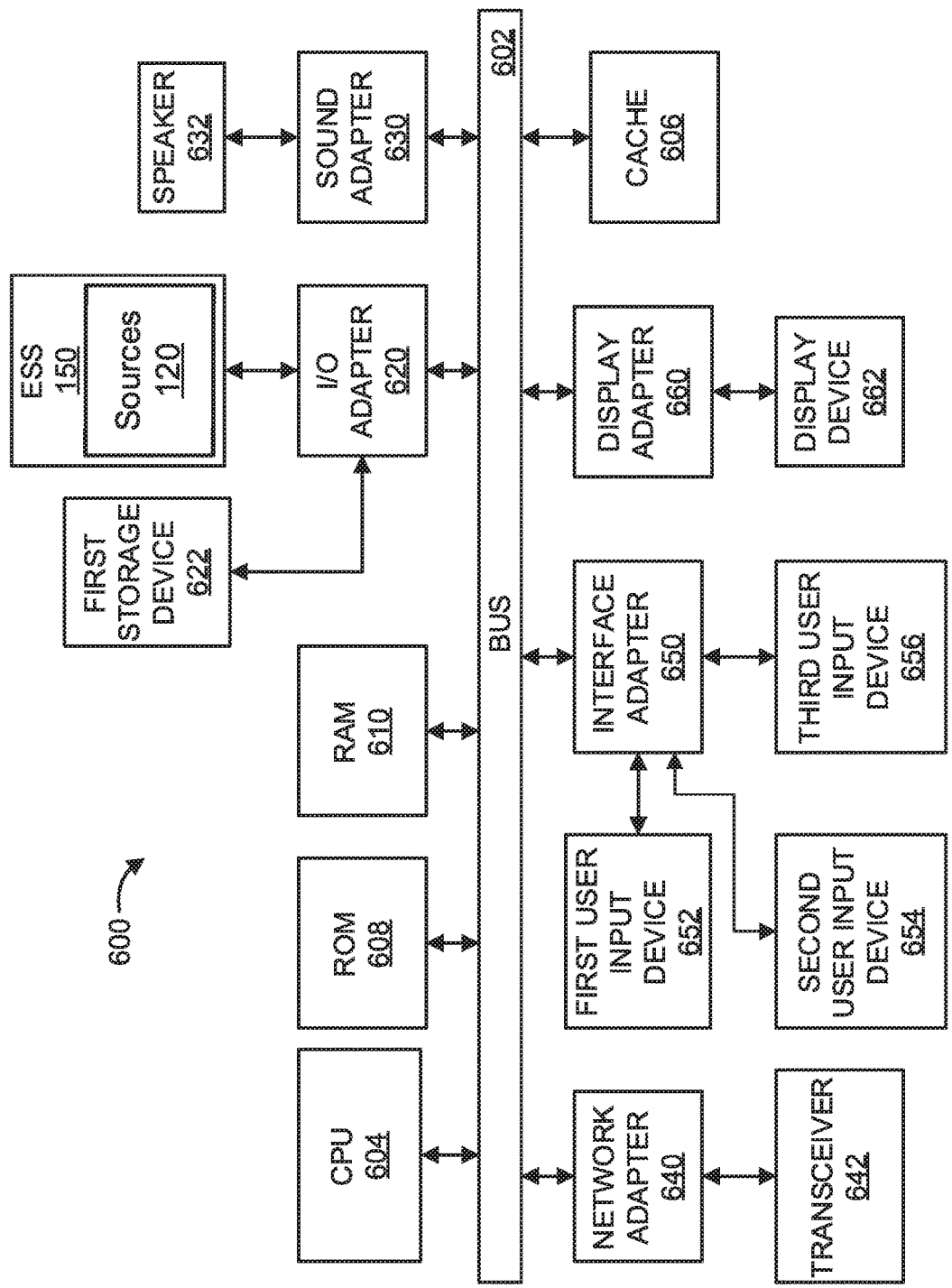
FIG. 6 is a block/flow diagram of an exemplary processing system with the enhanced search strategy, in accordance with embodiments of the present invention.

FIG. 6 is an exemplary processing system 600 with an enhanced search strategy 150, in accordance with an embodiment of the present invention. The processing system 600 includes at least one processor (CPU) 604 operatively coupled to other components via a system bus 602. A cache 606, a Read Only Memory (ROM) 608, a Random Access Memory (RAM) 610, an input/output (I/O) adapter 620, a sound adapter 630, a network adapter 640, a user interface adapter 650, and a display adapter 660, are operatively coupled to the system bus 602.

A first storage device 622 is operatively coupled to system bus 602 by the I/O adapter 620. The storage device 622 can be any of a disk storage device (e.g., a magnetic or optical disk storage device), a solid state magnetic device, and so forth. The enhanced search strategy 150 can be coupled to the system bus 602 by the I/O adapter 620. The enhanced search strategy 150 can receive candidate source material the processing system 600. The enhanced search strategy 150 can include known candidate sources 120. The enhanced search strategy 150 can utilize the known candidate sources 112 to assemble a search strategy to find new candidate sources related to a search topic.

A speaker 632 is operatively coupled to system bus 602 by the sound adapter 630. A transceiver 642 is operatively coupled to system bus 602 by network adapter 640. A display device 662 is operatively coupled to system bus 602 by display adapter 660. The enhanced search strategy 150 can employ the display adapter 662 to show a user the results of the search strategy.

A first user input device 652, a second user input device 654, and a third user input device 656 are operatively coupled to system bus 602 by user interface adapter 650. The user input devices 652, 654, and 656 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 652, 654, and 656 can be the same type of user input device or different types of user input devices. The user input devices 652, 654, and 656 are used to input and output information to and from system 600. The enhanced search strategy 150 can employ the user input devices 652, 654, and 656 to receive a search topic from the user and permit the user to adjust or modify the ranking of keyphrases utilized by the enhanced search strategy 150.

The processing system 600 may also include other elements (not shown), as readily contemplated by one of skill in the art, as well as omit certain elements. For example, various other input devices and/or output devices can be included in processing system 600, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 600 are readily contemplated by one of ordinary skill in the art given the teachings of the present invention provided herein.

Moreover, it is to be appreciated that environment 100 described above with respect to FIG. 1 is an environment for implementing respective embodiments of the present invention. Part or all of processing system 600 may be implemented in one or more of the elements of environment 100.

Figure 9:
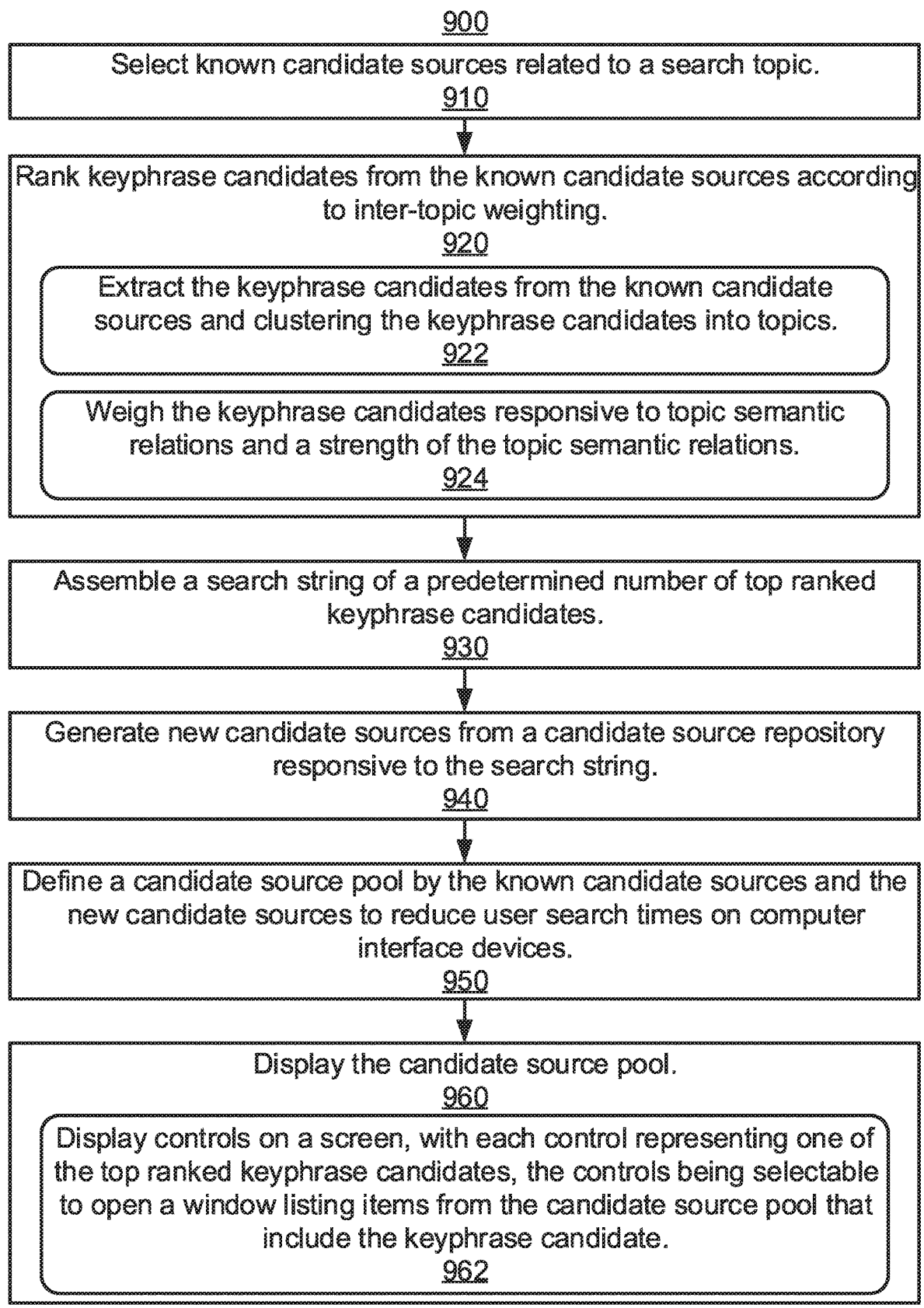
FIG. 9 is a block/flow diagram showing the enhanced search strategy method, in accordance with an embodiment of the present invention.

Further, it is to be appreciated that processing system 600 may perform at least part of the method described herein including, for example, at least part of the enhanced search strategy 150 of FIG. 1. and/or the enhanced search strategy method of FIG. 9.

Figure 7:
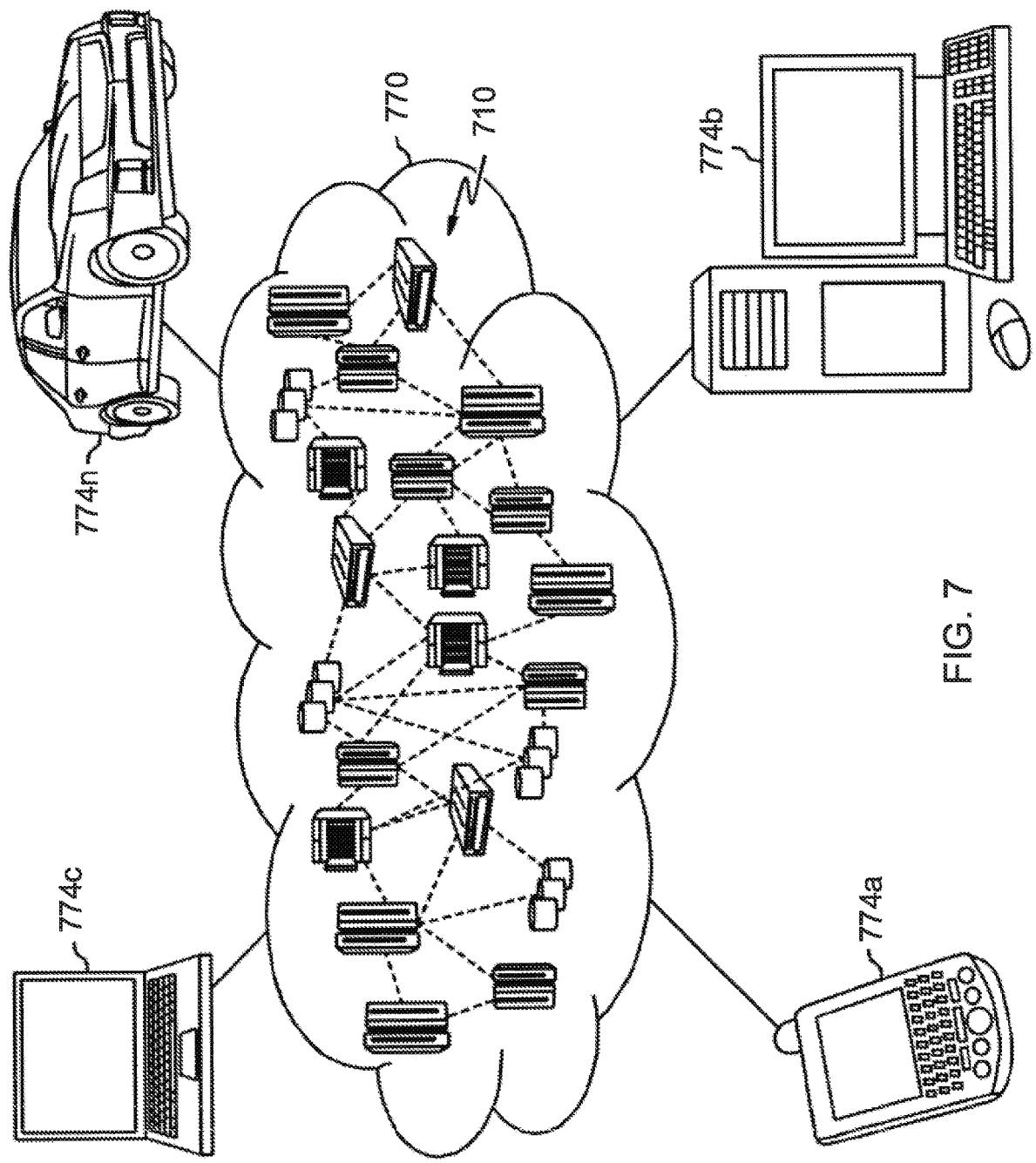
FIG. 7 is a block/flow diagram of an exemplary cloud computing environment, in accordance with an embodiment of the present invention.

FIG. 7 is a block/flow diagram of an exemplary cloud computing environment, in accordance with an embodiment of the present invention.

It is to be understood that although this invention includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 7, an illustrative cloud computing environment 770 is depicted for enabling use cases of the present invention. As shown, cloud computing environment 770 includes one or more cloud computing nodes 710 with which local computing devices used by cloud consumers, such as, for example, personal digital assistant (PDA) or cellular telephone 774A, desktop computer 774B, laptop computer 774C, and/or automobile computer system 774N can communicate. Nodes 710 can communicate with one another. They can be grouped (not shown) physically or virtually, in one or more networks, such as Private, Community, Public, or Hybrid clouds as described hereinabove, or a combination thereof. This allows cloud computing environment 770 to offer infrastructure, platforms and/or software as services for which a cloud consumer does not need to maintain resources on a local computing device. It is understood that the types of computing devices 774A-N shown in FIG. 7 are intended to be illustrative only and that computing nodes 710 and cloud computing environment 770 can communicate with any type of computerized device over any type of network and/or network addressable connection (e.g., using a web browser).

Figure 8:
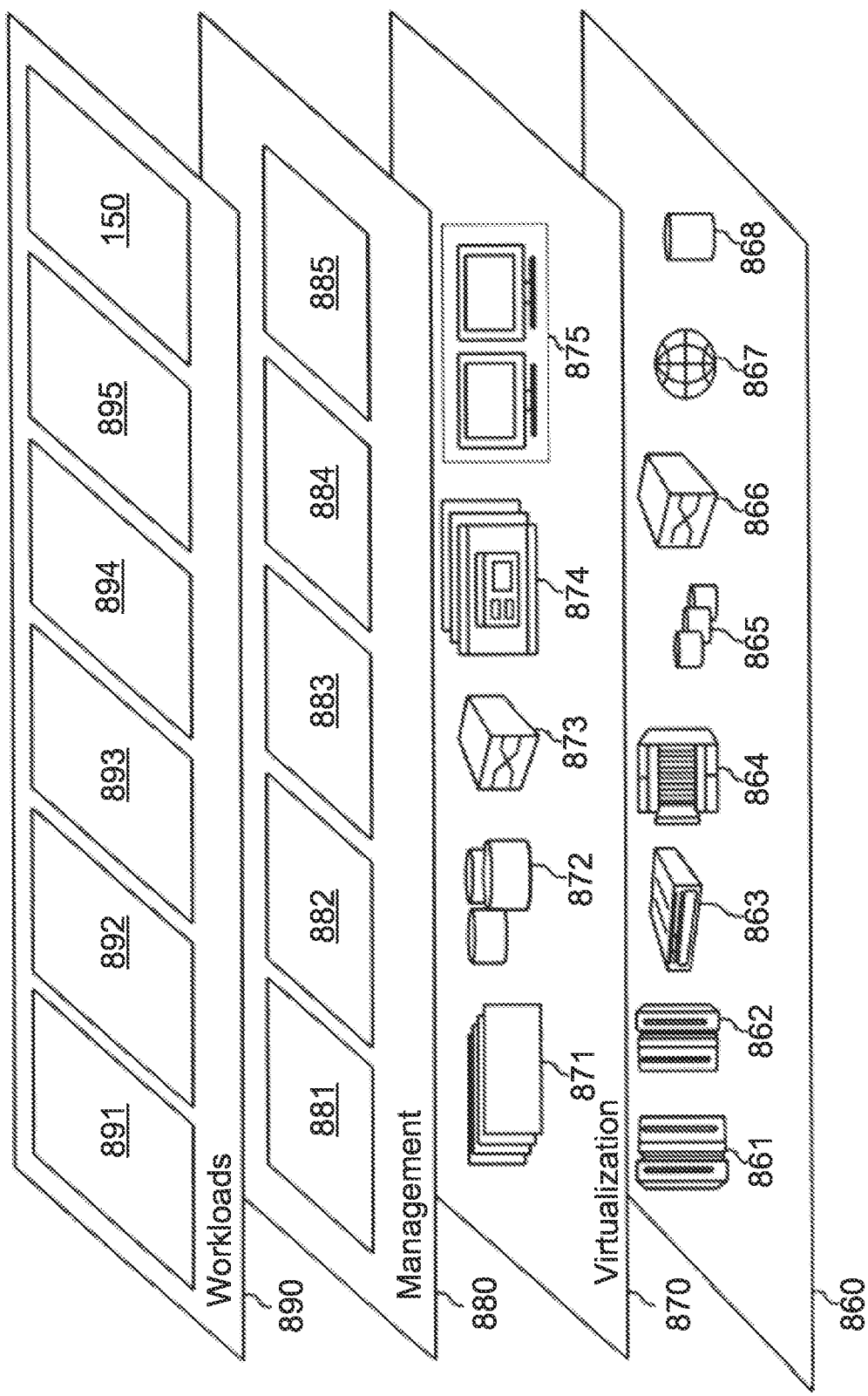
FIG. 8 is a schematic diagram of exemplary abstraction model layers, in accordance with an embodiment of the present invention.

FIG. 8 is a schematic diagram of exemplary abstraction model layers, in accordance with an embodiment of the present invention. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities can be provided: virtual servers 871; virtual storage 872; virtual networks 873, including virtual private networks; virtual applications and operating systems 874; and virtual clients 875.

In one example, management layer 880 can provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment can be utilized. Examples of workloads and functions which can be provided from this layer include: mapping and navigation 891; software development and lifecycle management 892; virtual classroom education delivery 893; data analytics processing 894; transaction processing 895; and the enhanced search strategy 150.

Referring to FIG. 9, methods for the enhanced search strategy 900 are illustratively shown and described. In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In block 910, known candidate sources related to a search topic can be selected. In block 920, keyphrase candidates from the known candidate sources can be ranked according to inter-topic weighting. In block 922, the keyphrase candidates can be extracted from the known candidate sources and clustering the keyphrase candidates into topics. In block 924, the keyphrase candidates can be weighed responsive to topic semantic relations and a strength of the topic semantic relations. In block 930, a search string of a predetermined number of top ranked keyphrase candidates is assembled. In block 940, new candidate sources can be generated from a candidate source repository responsive to the search string. In block 950, a candidate source pool can be defined by the known candidate sources and the new candidate sources. In block 960, the candidate source pool can be displayed. In block 962, controls can be displayed on a screen, with each control representing one of the top ranked keyphrase candidates, the controls being selectable to open a window listing items from the candidate source pool that include the keyphrase candidate.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of an enhanced search strategy system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for enhanced search strategies, comprising:
   selecting, by a processor device, known candidate sources related to a search topic;
   ranking, by the processor device, keyphrase candidates from the known candidate sources according to inter-topic weighting, with the weighting including at least positions of the keyphrase candidates in fields;
   assembling, by the processor device, a search string of a predetermined number of top ranked keyphrase candidates;
   generating, by the processor device, new candidate sources from a candidate source repository responsive to the search string; and
   defining, by the processor device, a candidate source pool by the known candidate sources and the new candidate sources to reduce user search times on computer interface devices.

2. The computer-implemented method as recited in claim 1, wherein selecting includes uploading the known candidate sources from a topic-specific corpus.

3. The computer-implemented method as recited in claim 1, wherein the known candidate sources include professional papers.

4. The computer-implemented method as recited in claim 1, wherein ranking includes extracting the keyphrase candidates from the known candidate sources and clustering the keyphrase candidates into topics.

5. The computer-implemented method as recited in claim 1, wherein ranking includes weighting the keyphrase candidates responsive to topic semantic relations and a strength of the topic semantic relations.

6. The computer-implemented method as recited in claim 5, wherein weighting includes generating a graph of clustered topics with vertices in the graph being topics, edges in the graph being semantic relations between topics, and weights of the edges being a strength of the semantic relation.

7. The computer-implemented method as recited in claim 1, wherein ranking includes selecting the fields in the known candidate sources that include the keyphrase candidates.

8. The computer-implemented method as recited in claim 1, wherein ranking includes weighting the keyphrase responsive to the field in which the keyphrase is located.

9. The computer-implemented method as recited in claim 1, wherein assembling includes displaying the ranking of the keyphrase candidates to permit a user to modify the ranking of the keyphrase candidates.

10. The computer-implemented method as recited in claim 1, further comprising displaying controls on a screen, with each control representing one of the top ranked keyphrase candidates, the controls being selectable to open a window listing items from the candidate source pool that include the keyphrase candidate.

11. A computer program product for enhanced search strategies, the computer program product comprising a non-transitory computer readable storage medium having program instructions embodied therewith, the program instructions executable by a computer to cause the computer to perform a method comprising:
    selecting, by a processor device, known candidate sources related to a search topic;
    ranking, by the processor device, keyphrase candidates from the known candidate sources according to inter-topic weighting, with the weighting including at least positions of the keyphrase candidates in fields;
    assembling, by the processor device, a search string of a predetermined number of top ranked keyphrase candidates;
    generating, by the processor device, new candidate sources from a candidate source repository responsive to the search string; and
    defining, by the processor device, a candidate source pool by the known candidate sources and the new candidate sources to reduce user search times on computer interface devices.

12. A searching system for enhanced search strategies, comprising:
    a processing system including a processor device, a display, and memory receiving candidate sources, the processing system programmed to:
        select known candidate sources related to a search topic;
        rank keyphrase candidates from the known candidate sources according to inter-topic weighting, with the weighting including at least positions of the keyphrase candidates in fields;
        assemble a search string of a predetermined number of top ranked keyphrase candidates;
        generate new candidate sources from a candidate source repository responsive to the search string;
        define a candidate source pool by the known candidate sources and the new candidate sources to reduce user search times on computer interface devices; and
        display the candidate source pool.

13. The system as recited in claim 12, further programmed to upload the known candidate sources from a topic-specific corpus.

14. The system as recited in claim 12, further programmed to display controls on a screen, with each control representing one of the top ranked keyphrase candidates, the controls being selectable to open a window listing items from the candidate source pool that include the keyphrase candidate.

15. The system as recited in claim 12, further programmed to extract the keyphrase candidates from the known candidate sources and cluster the keyphrase candidates into topics.

16. The system as recited in claim 12, further programmed to weight the keyphrase candidates responsive to topic semantic relations and a strength of the topic semantic relations.

17. The system as recited in claim 16, further programmed to generate a graph of clustered topics with vertices in the graph being topics, edges in the graph being semantic relations between topics, and weights of the edges being a strength of the semantic relation.

18. The system as recited in claim 12, further programmed to select fields in the known candidate sources that include the keyphrase candidates.

19. The system as recited in claim 12, further programmed to weight the keyphrase responsive to a field the keyphrase is located and a position of the keyphrase in the field.

20. The system as recited in claim 12, further programmed to display the ranking of the keyphrase candidates to permit a user to modify the ranking of the keyphrase candidates.

* * * * *